No. 859,194. PATENTED JULY 9, 1907.
C. BLASCO.
SEED SEPARATING APPARATUS.
APPLICATION FILED DEC. 17, 1906.

Fig. 1.
Fig. 2.
Fig. 3.

Attest:
J. C. Sands
R. W. Ceshlee

Inventor:
Charles Blasco
by Mastick Jones
his Attys

UNITED STATES PATENT OFFICE.

CHARLES BLASCO, OF HABANA, CUBA.

SEED-SEPARATING APPARATUS.

No. 859,194.  Specification of Letters Patent.  Patented July 9, 1907.

Application filed December 17, 1906. Serial No. 348,097.

*To all whom it may concern:*

Be it known that I, CHARLES BLASCO, a citizen of the United States, residing at Habana, Cuba, have invented certain new and useful Improvements in Seed-Separating Apparatus, of which the following is a specification.

My invention relates to improvements in seed separating apparatus having particular reference to tobacco seed separating and has as its object the providing of means whereby the heavier seeds may be readily separated from the lighter ones without the disassembling of the apparatus.

In the following is described in connection with the accompanying drawings one embodiment of the apparatus the features thereof being more particularly pointed out hereinafter in the claims.

In the drawings Figure 1 is a side view of the apparatus showing the seed separating member and parts adjacent thereto in vertical section; Fig. 2 is a modified form of the air blast controlling valve and a means for extracting the seeds from the seed containing chamber; and Fig. 3 is a vertical sectional view of the seed receptacle and draw off controlling means.

Similar numerals of reference indicate similar parts throughout the several views.

Referring to the drawings 1 indicates a bellows provided with a foot pedal 2 mounted on base 3 supported by means of standards 4.

5 is a hood of fine wire or cord mesh mounted on the under side of said base 3 and is adapted to act as a dust preventive, also means of permitting air to enter into said bellows.

6 is a flexible hose connecting the bellows 1 as at 7 with the lower end of the air tube 8. Said tube 8 is enlarged as at 9, the enlarged portion thereof forming a seat 10 for the air passage controlling valve 11. Said passage controlling valve 11 comprises a shank 12, a core 13 having suitably cut therein a by-pass 14 and a hand-controlling wheel 15.

16 is an air passage or pipe connection between said enlarged portion 9 in the enlarged seat 17 of the seed container which has in turn mounted therein at the bottom thereof a fine screen mesh 18, the object of the same being to provide means whereby the seeds contained therein are prevented from falling into or entering the air passage 16.

19 is a glass tube forming a connection between the enlarged seat 17 and the re-inforced portion 20 of the charging device 21 which comprises a funnel receptacle 22, a by-pass 23, and a controlling valve 24. The object of said glass tube 19 is to provide means whereby the operator of the apparatus is enabled to observe the contents thereof, the amount of seeds being operated upon, and the time when the container is to be replenished. 25 is a pipe connecting the re-inforced portion 20 with a collector and retainer (not shown) mounted at the extreme upper end of said pipe 24, the object of said collector being to provide means whereby the seeds discharged therefrom may be collected and retained.

Referring to Fig. 3 26 is a controlling valve rigidly mounted in the casing of enlarged member 17 and forms at that point part of the bottom 18 and has suitably fastened therein as at 27 a draw off pipe 28. Said draw off pipe 28 has formed at its extreme lower end a discharge nozzle 29, the object of the above described parts being to provide means whereby the heavier or healthy seeds may be drawn off into a suitable container (not shown) without the discontinuance of the air blast or the disassembling of the respective parts of the apparatus.

Fig. 2 of the drawings illustrates a modified form of the air blast controlling valve and means for drawing off the seeds in which 30 is the tube connection between the flexible hose or lead from the bellows and an enlarged portion of the seed reception chamber 31 having suitably mounted therein a screen mesh or bottom 32 adapted to act as a means of preventing the seeds from entering the air blast controlling valve 33. 34 is a passage controlling valve suitably fastened into the casting of the enlarged portion or reception chamber 31, and has fastened therein at its lower portion thereof a draw off connection 35 having formed at its extreme lower end a discharge nozzle 36 adapted to discharge the seeds passing therethrough into a suitable container (not shown). 37 is a glass tube or gage the same acting as a means whereby one may observe the contents of the seed container. The seed separating device and parts adjacent thereto are mounted in and supported by standard 38.

The operation of the apparatus is as follows. Seed is poured into the funnel 22, then passage controlling valve 24 is opened permitting the seed to pass downwardly through passage 23 into receiving or observing chamber 19; after said seed receiving chamber is filled solid with seeds valve 24 is closed preventing the lighter seeds from being blown out through the charging means. Valve 11 is then opened by turning handwheel 15 sufficiently to permit of a certain pressure of air into connection 16. Bellows 1 is compressed by foot pedal 2 causing the current of air generated therein to pass therefrom through flexible hose 6 into passage-way 8 through said valve 11, thence on into and through the seeds in the seed receptacle which causes the lighter seeds to be blown through the exhaust tube 25 into said aforesaid collector and retainer (not shown) mounted at the upper end of said exhaust tube. Upon completion of the above described operation valve 26 is opened permitting all of the large seeds retained in said seed container to pass downwardly through the draw off passage 28 into a suitable collector (not shown).

The result of utilizing the structure illustrated in Fig. 2 of the drawings is the same as above described excepting that the parts comprising the same are much simpler in their general form of construction.

It is obvious that the apparatus as above described may be adapted for use in connection with all seed separating and the same used to a great advantage.

It is further obvious that the means for accomplishing the above and parts comprising the same may be widely varied without departing from the spirit of the invention.

What I claim and desire to secure by Letters Patent of the United States is:—

1. An apparatus of the character described comprising a transparent seed receptacle, a perforated bottom therefor, a pipe connection in communication therewith, a controlling valve interposed in said pipe connection, an air blast supply, connections between said air blast supply and said pipe connection, and means mounted in said transparent seed receptacle bottom for drawing off the heavier seeds after the lighter ones have been separated therefrom.

2. An apparatus of the character described including a transparent seed receptacle, a feed therefor, an auxiliary discharge pipe connected to said seed receptacle, a perforated bottom in said transparent seed receptacle, an air blast lead connected thereto, an air blast supply connected to said air blast lead, and a draw-off passage connected with said transparent seed receptacle adapted to draw off the heavier seeds contained therein after the lighter ones have been separated therefrom.

3. An apparatus of the character described including a transparent seed receptacle, means for charging said seed receptacle, an auxiliary discharge pipe connected therewith at the upper end of said transparent seed receptacle, an air blast lead connected thereto at the lower end of said seed receptacle and an air blast supply having a passage controlling valve mounted thereon.

4. An apparatus of the character described including a transparent seed receptacle, a perforated bottom formed in said seed receptacle, an air blast supply connected with said seed receptacle, an auxiliary discharge pipe connected therewith and a draw off passage having mounted therein a controlling valve adapted to permit the pasage of the heavier seeds therethrough after the lighter ones have been separated therefrom.

5. An apparatus of the character described including a transparent seed receptacle, means for charging said receptacle, an auxiliary discharge pipe connected therewith, an air blast supply connected therewith, means for controlling said air blast supply and means for drawing off the heavier seeds contained therein after the lighter ones have been separated therefrom.

In testimony whereof I have hereunto signed my name in the presence of two subscribing witnesses.

CHARLES BLASCO.

Witnesses:
 EDO RAABLOT,
 ADRIANO T. L. NUSSA.